United States Patent [19]
Seibert et al.
[11] 3,863,164
[45] Jan. 28, 1975

[54] TUBE FILAMENT POWER SUPPLY

[75] Inventors: William Louis Seibert; Paul Carleton Wilmarth, both of Indianapolis, Ind.

[73] Assignee: RCA Corporation, New York, N.Y.

[22] Filed: Oct. 29, 1973

[21] Appl. No.: 410,822

[52] U.S. Cl. .................. 328/270, 328/208, 328/258, 315/96
[51] Int. Cl. .................. H01j 19/16
[58] Field of Search ....... 328/270, 208, 258; 315/96

[56] References Cited

UNITED STATES PATENTS

| | | | |
|---|---|---|---|
| 2,658,140 | 11/1953 | Koch | 328/270 |
| 3,171,084 | 2/1965 | Szikla | 328/270 |
| 3,339,019 | 8/1967 | Knorr et al. | 328/270 X |
| 3,339,105 | 8/1967 | Busse | 328/270 X |
| 3,611,012 | 10/1971 | Lemmon | 328/270 X |
| 3,826,989 | 7/1974 | Keith | 328/270 |

*Primary Examiner*—John S. Heyman
*Attorney, Agent, or Firm*—Eugene M. Whitacre; Mason DeCamillis

[57] ABSTRACT

In a television receiver employing vacuum tubes, and which includes a full-wave bridge rectifier circuit for developing the required direct operating potential for the circuits, and for energizing the filaments, a standby circuit delivers one-half wave rectified voltage to the filaments of the vacuum tubes during standby operation by means of an additional diode in one leg of the bridge rectifier. A switch and a further diode disconnects the bridge rectifier from the power supply filter during standby operation thereby preventing the application of the operating potential to the circuits during the standby operating mode. The circuit delivers full-wave rectified voltage to the filaments during normal operation.

9 Claims, 4 Drawing Figures

TUBE FILAMENT POWER SUPPLY

This invention relates to power supplies for television receivers.

In recent years, vacuum tube television receivers have employed circuits which apply reduced power to the vacuum tube filaments during a standby mode of operation. The warm up time of the instrument is thus greatly reduced when switched into operation. The reduced power during standby operation has been accomplished for example by placing a diode across the power switch. When in the standby condition (power switch open) one-half wave rectified voltage is applied to the filaments. When in operation (power switch closed) the diode is electrically shorted and an alternating current delivers full power to the filaments. Other systems utilize the power supply rectifier diode and a double pole switch to couple the diode to the filament string during standby operation while simultaneously disconnecting the diode from the direct power output circuit. During operation of the entire instrument, the diode is switched into the direct voltage power output circuit and the filament string is coupled to an alternating voltage. Common to both of these methods and other similar systems is the application of one-half wave rectified voltage to the filaments during standby operation and an alternating voltage (not rectified) to the filaments during normal operation. Still another system supplies full-wave rectified direct voltage to the filaments during normal operation, and half-wave rectified voltage to the filaments during standby operation.

Operation of the filaments by full-wave rectified voltage is advantageous in that raster movement due to leakage of alternating power line frequency current between the filaments and cathodes of stages such as the horizontal oscillator is prevented. This movement can be particularly objectionable where the frequency of input power to the receiver varies considerably from the television field transmission rate, for example, when the power line frequency is 50 Hz and the television field rate is 60 Hz. Such standards are employed in some countries. It is desirable in designing "universal" receivers to take such standards into account so as to permit use of a given receiver design in as large a number of different countries as possible.

Due to the reduced cost of solid state diodes, it is economically feasible to employ full-wave bridge rectifiers as the means for supplying the direct operating potential (B+) in receivers. A cost advantage is realized since the B+ filter may employ a resistance-capacitance (R.C.) type filter rather than the inductance-capacitance (L.C.) filter usually necessary when only half-wave rectification is used. U.S. Pat. No. 3,611,012 describes a system which provides full-wave rectified direct current to the filaments during operation with a full-wave rectifier power supply circuit. However, in that system, multiple pole mechanical switches are used to remove operating power from the receiver and to recondition the full-wave bridge during standby.

In accordance with the present invention, an electronic signal processing apparatus including a number of vacuum tubes having filaments comprises rectifying means coupled to a source of alternating voltage to develop a full-wave rectified voltage between first and second output terminals and a half-wave rectified voltage between the first terminal and a third terminal. The vacuum tube filaments are connected between the first and third terminals.

Switching means operable between normal and standby modes of operation are coupled in circuit with the rectifying means for converting the voltage developed between the first and third terminals to full-wave rectified voltage during a normal mode of operation.

The invention will now be described in greater detail referring to the drawing in which.

Figures 1, 2, 3, 4:
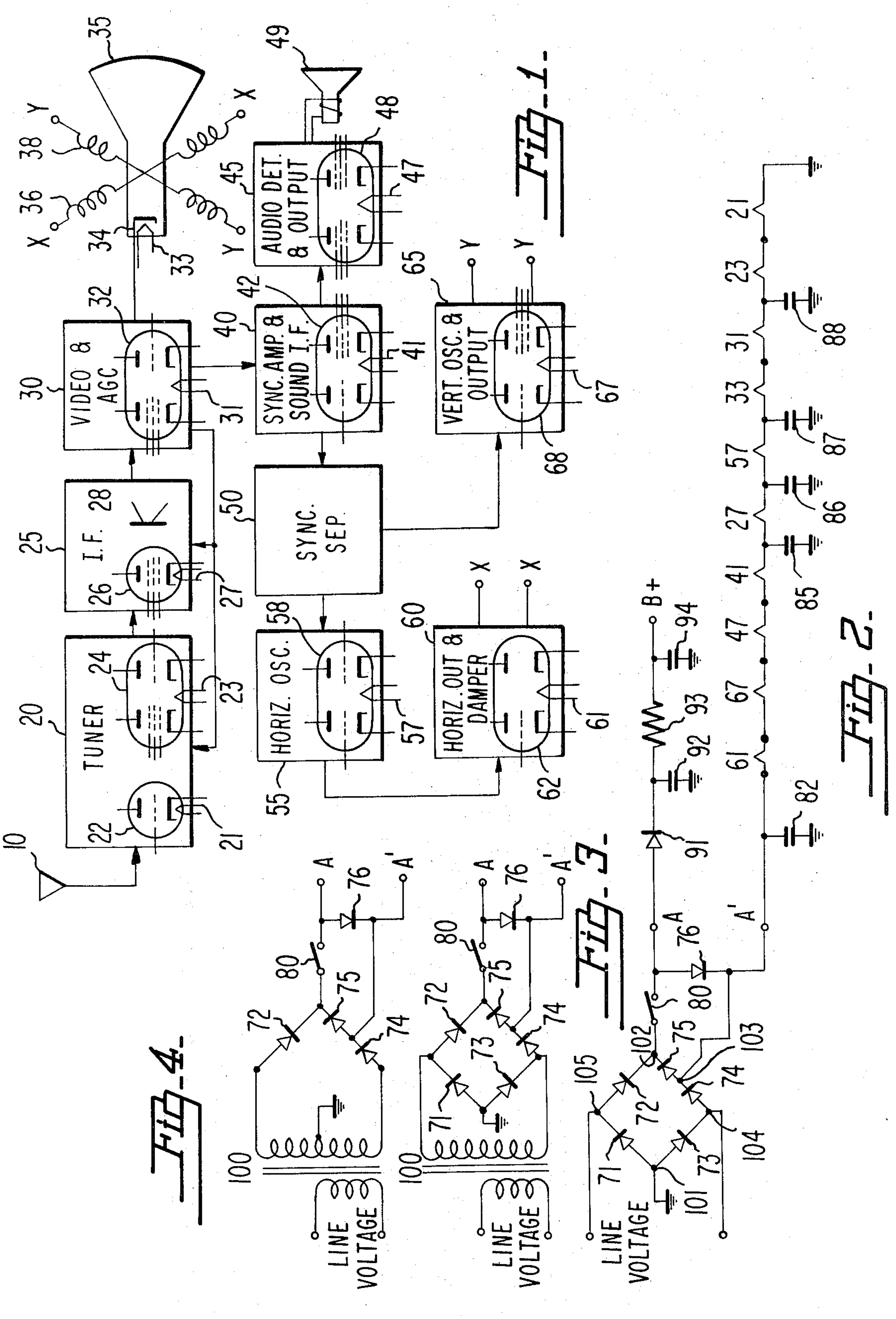
FIG. 1 is a block diagram of a television receiver of the type including vacuum tubes which are illustrated diagrammatically in several of the stages.
FIG. 2 is a schematic circuit diagram showing the direct voltage supply used to power the receiver shown in FIG. 1, the diagram including the filament string for the vacuum tubes of FIG. 1 and the power switching feature of the present invention.
FIGS. 3 and 4 are schematic diagrams illustrating alternative embodiments of the present invention.

Referring now to the television receiver of FIG. 1, an antenna 10 receives composite television signals including audio, video, and synchronizing signals and couples these signals to a tuner 20. The tuner 20 includes a radio frequency amplifier with a vacuum tube 22 having a filament 21 and local oscillator and mixer stages which incorporate a dual purpose vacuum tube 24 having a filament 23. The tuner 20 amplifies the incoming composite signals and converts these signals to lower intermediate frequency (I.F.) signals which are then coupled to the I.F. section 25 of the television receiver. I.F. section 25 includes a first amplifier stage having a vacuum tube 26 with a filament 27 and a second transistorized stage 28 which does not require filament power. The I.F. section 25 amplifies the frequency-converted composite signals and couples them to the video and automatic gain control (A.G.C.) stage 30 of the receiver, the latter including a vacuum tube 32 of the dual purpose type having a filament 31. The triode section of vacuum tube 32 is utilized in a keyed type A.G.C. circuit configuration. A.G.C. signals are coupled to the tuner 20 and I.F. section 25. The video stage includes a video detector such as a diode (not shown) for producing video frequency signals from the composite television signals. The pentode section of tube 32 is utilized as a video output amplifier, and amplified video signals therefrom are coupled to a control element 34 of a kinescope 35 having a filament 33.

Amplifier stage 40 is coupled to the video amplifier 30 to receive synchronization and audio signals. Included in stage 40 is a dual purpose vacuum tube 42 having a filament 41. A pentode section of tube 42 is utilized as an audio I.F. amplifier, and the amplified audio I.F. signals are coupled to an audio detector and output stage 45. A dual purpose pentode tube 48 having a filament 47 detects the audio frequency components of the audio I.F. signal, amplifies the resulting audio signals and couples them to a speaker 49 to reproduce the audio portion of the television program.

The synchronizing signals coupled to stage 40 are amplified by the triode amplifier and are coupled to a synchronizing signal separator stage 50 which separates the horizontal and vertical synchronizing components and couples them to the horizontal oscillator stage 55 and to the vertical oscillator stage 65, respectively. The horizontal oscillator 55 includes a vacuum tube 58 having a filament 57. Horizontal frequency (e.g., 15,734 Hz) signals developed by the oscillator are coupled to the horizontal output stage 60 which includes a dual purpose tube 62 having a filament 61. The pentode section of tube 62 is utilized as a horizontal output tube while the diode section of tube 62 is utilized as a damper diode for the horizontal output stage. The horizontal output stage 60 provides the horizontal deflection current by means of interconnection X—X to a horizontal yoke 36 associated with the kinescope 35. Likewise the vertical oscillator and output stage 65 provides the vertical deflection current by means of interconnection Y—Y to a vertical yoke 38 also associated with the kinescope 35. Having described the receiver which includes several vacuum tube stages and which is typical of many receiver types, attention is directed to FIG. 2.

In FIG. 2 there is illustrated the power supply for providing the direct operating potential (B+) to the various stages of the receiver of FIG. 1. The series filament string which is supplied with operating power in accordance with the teachings of the present invention is also shown.

In FIG. 2, line voltage is supplied to a full-wave bridge rectifier circuit comprising diodes 71, 72, 73, 74. An additional diode 75 is series connected between diode 74 and an output terminal 102 of the bridge rectifier. The junction of diodes 71, 72 and the junction of diodes 73, 74 are utilized as input terminals 104, 105. The junction of diodes 71, 73 is connected to ground to provide a first output terminal 101. The junction of diodes 72, 75 provides a second output terminal 102. The junction of diodes 74, 75 provides a third output terminal 103.

The series string of filaments identified with numerals corresponding to numerals of the filaments in the vacuum tubes of FIG. 1 is connected between the third output terminal 103 and the first output terminal 101 (ground) of the bridge rectifier.

A switch 80 couples the second output terminal 102 to the B+ output terminal via a diode 91 and a filter network including capacitors 92, 94 and resistor 93.

A diode 76 is coupled from the junction of switch terminal 80 and diode 91 to the third output terminal 103. Several filter components including capacitors 82, 85, 86, 87, and 88 are included as shown in the filament string to provide the desired filtering to each tube filament during operation. A resistor (not shown) may be inserted in series with the filament string at point A′ to further adjust the total filament voltage.

Operation of the power supply circuit in either normal or standby modes of operation is determined by the position of switch 80. Switch 80 in the open position, as illustrated in FIG. 2, provides standby operation in the following manner.

Alternating line voltage (A.C.) is applied to bridge rectifier input terminals 104, 105 and a rectified full-wave voltage appears between output terminals 101 and 102 as the alternating voltage applied to terminals 104 and 105 changes polarity on alternate half cycles. Since switch 80 is open, the B+ supply is inoperative.

However, because of the operation of diode 74 half-wave rectified voltage appears between output terminals 101 and 103. Diode 75 is poled oppositely with respect to diode 72 to block passage of the positive voltage excursion occurring on alternate half cycles of the alternating voltage. The half-wave rectified voltage appearing at terminal 103 is applied to the filament string and provides the desired half-power operation for an efficient standby operation of the television receiver. Diode 76 which is coupled between the filament string and the input to the B+ filter is poled to be non-conducting during the standby or open position of switch 80 thus isolating the filament string from the B+ line during standby operation.

When switch 80 is in the normal or closed position, the full-wave rectified output of the bridge rectifier appearing at terminal 102 is coupled to the B+ terminal via diode 91 and filter network 92, 93, 94. The filtered, full-wave output appearing at the B+ terminal provides normal operating power for the various circuits of the television receiver. With switch 80 in the closed position, the full-wave rectified output of the bridge rectifier also appears at the anode of rectifier 76. Rectifier 76 allows the missing half cycle of rectified alternating voltage, which had been blocked by diode 75 in the standby mode, to appear at the filament string output terminal 103. The filament string now receives full-wave rectified direct voltage for full temperature operation consistent with the operating B+ voltage applied to the various receiver circuits. The desired normal operation is thus achieved. Diode 91, which is poled to conduct direct current from terminal 102 to charge the input filter capacitor 92, also serves to prevent accumulated charge on the filter network 92, 93, 94 from leaking back through the series filament string and thereby lowering the B+ voltage available for operation of the receiver.

FIG. 3 illustrates an alternative embodiment of the power supply of FIG. 2 with the addition of transformer 100. Transformer 100 will provide isolation from the A.C. power line so that the receiver chassis may be operated as a "cold chassis." The windings of transformer 100 may also be proportioned to operate the receiver from any desired commercially available line voltage as well as adjusted to increase the alternating voltage coupled to the rectifying means in order to develop a desired B+ and filament voltages.

FIG. 4 illustrates a further alternative embodiment of the power supply of FIGS. 2 and 3 wherein a center-tapped transformer 100 and diodes 72, 74, 75 replace the bridge rectifier of FIGS. 2 and 3.

In the event that it is desirable to totally disable the receiver i.e., for an extended period of non-use, a line switch (not shown) may be included in one or both of the line terminals to remove the A.C. line voltage until it is desired to restore the standby feature provided by the present invention.

What is claimed is:

1. A power supply for electronic apparatus including at least one vacuum tube with a filament comprising:

supply means for providing a source of alternating voltage;

rectifying means coupled to said source of alternating voltage to develop therefrom a full-wave rectified voltage between first and second output terminals, and a half-wave rectified voltage between said first terminal and a third terminal;

means for connecting said vacuum tube filament between said first and third terminals; and switch means operable between normal and standby modes of operation coupled between said second and third terminals of said rectifying means for converting the voltage developed between said first and third terminals to full-wave rectified voltage during a normal mode of operation.

2. A circuit as defined in claim 1 wherein said switching means includes a diode coupled between said second and third terminals.

3. A circuit as defined in claim 2 wherein said switching means includes a switch operable between normal and standby modes of operation coupled in series relation with said diode between said second output terminal and said third terminal.

4. A circuit as defined in claim 1 wherein said supply means comprises a transformer having a primary winding adapted to be coupled to a source of alternating voltage and a secondary winding for developing alternating voltages of opposite polarities at opposite ends of said secondary winding.

5. A circuit as defined in claim 4 wherein said transformer includes a grounded center tap secondary winding, and said rectifying means comprises at least two diodes, each coupled to one of said opposite ends of said secondary winding and to said second output terminal to provide a full-wave rectified voltage at said second output terminal, and a third diode serially coupling one of said diodes to one of said ends of said secondary winding and coupled to said third terminal to provide a half-wave rectified voltage at said third terminal.

6. A circuit as defined in claim 1, wherein said rectifying means comprises a full-wave bridge rectifier arrangement having at least one diode in each leg of said bridge; and an additional diode coupled in series with one of said diodes in one leg of said bridge between said second and third output terminals to provide said half-wave rectified voltage at said third output terminal.

7. A circuit as defined in claim 6, wherein said switching means includes a further diode serially coupled to said additional diode, the series combination of said further diode and said additional diode being coupled between said second and third terminals.

8. A circuit as defined in claim 7, wherein said switching means includes a switch operable between normal and standby modes of operation serially coupled with said further diode across said additional diode, the combination coupled between said second and third terminals for providing at said third terminal a full-wave rectified voltage in a normal mode and a half-wave rectified voltage in a standby mode.

9. A power supply comprising:

a full-wave bridge rectifier having input terminals adapted to be coupled to a source of alternating voltage and first and second output terminals to provide a full-wave rectified voltage therefrom;

additional rectifying means serially coupled in one leg of said full-wave bridge rectifier between said second and a third output terminal to provide a half-wave rectified voltage at said third output terminal;

means for connecting at least one vacuum tube filament between said first and third output terminals;

switching means including a diode operable between normal and standby modes of operation serially connected between said second and third terminals for providing to said filament a full-wave rectified voltage in a normal mode and a half-wave rectified voltage in a standby mode.

* * * * *